(12) United States Patent
Ichikawa et al.

(10) Patent No.: US 9,235,066 B2
(45) Date of Patent: Jan. 12, 2016

(54) OPTICAL MODULATOR (71) Applicant: SUMITOMO OSAKA CEMENT CO., LTD., Chiyoda-Ku, Tokyo (JP)

(72) Inventors: Junichiro Ichikawa, Tokyo (JP); Satoshi Oikawa, Tokyo (JP); Hiroshi Murata, Takarazuka (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 171 days.

(21) Appl. No.: 14/037,932

(22) Filed: Sep. 26, 2013

(65) Prior Publication Data

US 2014/0086524 A1 Mar. 27, 2014

(30) Foreign Application Priority Data

Sep. 26, 2012 (JP) .................................. 2012-213286

(51) Int. Cl.
*G02F 1/035* (2006.01)
*G02F 1/01* (2006.01)
(Continued)

(52) U.S. Cl.
CPC .............. *G02F 1/0115* (2013.01); *G02F 1/225* (2013.01); *G02F 1/3558* (2013.01); *H04B 10/25137* (2013.01); *H04B 10/505* (2013.01)

(58) Field of Classification Search
CPC ..... G02F 1/0115; G02F 1/3558; G02F 1/225; G02F 1/05; G02F 1/0508; G02F 2001/3548; H04B 10/25137; H04B 10/505
See application file for complete search history.

(56) References Cited

U.S. PATENT DOCUMENTS 7,413,635 B2 * 8/2008 Essaian .......................... 204/164
7,532,777 B2 * 5/2009 Mitomi et al. ......... G02F 1/0356
385/129

(Continued)

FOREIGN PATENT DOCUMENTS

| JP | H04-269706 A | 9/1992 |
| JP | H05-264937 A | 10/1993 |

(Continued)

OTHER PUBLICATIONS

Killey, R.I., et al., "Electronic Dispersion Compensation by Signal Predistortion Using Digital Processing and a Dual-Drive Mach-Zehnder Modulator," IEEE Photonics Technology Letters, vol. 17, No. 3 (Mar. 2005), pp. 714-716.

*Primary Examiner* — Rhonda Peace
(74) *Attorney, Agent, or Firm* — Taft Stettinius & Hollister LLP (57) ABSTRACT

An optical modulator that includes a substrate 1 composed of a material having an electro-optical effect, an optical waveguide 2 formed in the substrate, and a modulation electrode 3 for modulating lightwaves propagating through the optical waveguide, in which output light L2 that is output from the optical waveguide is guided with an optical fiber, wavelength dispersion characteristics of the optical fiber transmission line are compensated for by performing polarization reversal 10 of the substrate along the optical waveguide with a predetermined pattern so that the substrate along the optical waveguide has waveform distortion with characteristics that are inverse to the wavelength dispersion characteristics of the optical fiber transmission line, and the compensation for the wavelength dispersion characteristics is adjusted to a predetermined level by disposing an adjustment member made of a dielectric material or a metal material in the vicinity of the modulation electrode.

8 Claims, 4 Drawing Sheets (51) Int. Cl.
  *G02F 1/225* (2006.01)
  *G02F 1/355* (2006.01)
  *H04B 10/2513* (2013.01)
  *H04B 10/50* (2013.01)

(56) References Cited

U.S. PATENT DOCUMENTS 8,175,422 B2 * 5/2012 Okazaki et al. .................. 385/8
8,755,641 B2 * 6/2014 Ichikawa et al. ................. 385/3
2008/0050082 A1 2/2008 Mitomi et al.
2012/0230625 A1 9/2012 Ichikawa et al.
2014/0086524 A1 * 3/2014 Ichikawa et al. ................. 385/3

FOREIGN PATENT DOCUMENTS

| JP | H07-181437 A | 7/1995 |
| JP | 2004-12714 A | 1/2004 |
| JP | 2004-109627 A | 4/2004 |
| JP | 2010-126475 A | 4/2004 |
| JP | 2008-52109 A | 3/2008 |
| JP | 2010-226254 A | 10/2010 |

* cited by examiner

OPTICAL MODULATOR

BACKGROUND OF THE INVENTION

1. Technical Field

Priority is hereby claimed to Japan Patent Application No. 2012-213286 filed on Sep. 26, 2012, and such priority application is hereby incorporated by reference herein, in its entirety. The present invention relates to an optical modulator and in particular, relates to an optical modulator that compensates for wavelength dispersion of an optical fiber transmission line.

2. Background Art

In the field of optical communication and the field of optical measurement system, light waves modulated by an optical modulator are transmitted using optical fibers. Since, the propagation speed and the length of a propagation pathway of light differ according to the wavelength in an optical fiber, wavelength dispersion occurs and the wavelength of optical signals is distorted. Therefore, technology that compensates for wavelength dispersion of an optical fiber transmission line is essential ire the high-speed communications that exceeds 40 Gbps, the high-speed transmission systems of wavelength multiplexing and the like.

As methods of compensating for wavelength dispersion, there are methods that dispose dispersion compensation fibers immediately prior receivers of optical signals, and use optical devices such as the fiber Bragg grating (FBG) and etalon of Patent Document 1, and furthermore, there are methods that use a digital signal processing circuit such as those of Patent Document 2 and Non-Patent Document 1. In the method using digital signal processing circuits, an impulse response, which corresponds to changes in real parts and imaginary parts with respect to wavelength dispersion and performs compensation with a digital signal processor, is generated.

In the method using dispersion compensation fibers, the degree of accuracy of the compensation is limited by the smallest unit of the compensation amount thereof, and in addition, since wavelength division multiplexing (WDM) light or the like is separated in the compensation for wavelength dispersion of WDM light or the like, an optical device such as an FBG that functions as a wavelength dispersion compensating device or the like is also necessary. Furthermore, in addition to the fact that there is a limit to the bands of wavelength that optical devices such as FBGs can handle, there is a large amount of optical loss. Additionally, in digital signal processing circuits, there is a problem in that high-speed processing that exceeds 40 Gbps is technically difficult.

RELATED ART DOCUMENTS

Patent Documents

[Patent Document 1] JP-A-2004-12714
[Patent Document 2] JP-A-2010-226254

Non-Patent Documents

[Non-Patent Document 1] Robert I. Killey et al., "Electronic Dispersion Compensation by Signal Predistortion Using Digital Processing and a Dual-Drive Mach-Zehnder Modulator", IEEE Photonics Technology letters, Vol. 17, No. 3, pp. 714-716, 2005

SUMMARY OF THE INVENTION

An object of the present invention is to provide an optical modulator that can compensate for wavelength dispersion of an optical fiber transmission line and is capable of being applied to high-speed transmission that exceeds a few tens of Gbps.

According to a first aspect of the invention, there is provided an optical modulator that comprises a substrate composed of a material having an electro-optical effect, an optical waveguide formed in the substrate, and a _modulation electrode for modulating light waves propagating through the optical waveguide, in which output light that is output from the optical waveguide is guided with an optical fiber, wavelength dispersion characteristics of the optical fiber transmission line are compensated for by performing polarization reversal of the substrate along the optical waveguide with a predetermined pattern so as to give waveform distortion with characteristics that are inverse to the wavelength dispersion characteristics of the optical fiber transmission line to the light waves propagating through the optical waveguide, and the compensation for the wavelength dispersion characteristics is adjusted to a predetermined level by disposing an adjustment member made of a dielectric material or a metal material in the vicinity of the modulation electrode.

According to a second aspect of the invention, in the optical modulator related to the first aspect, the distance between the adjustment member and the modulation electrode is set so as to be variably adjustable.

According to a third aspect of the invention, in the optical modulator related to the first or second aspect, the optical waveguide includes a Mach-Zehnder waveguide that has two branching waveguides, a polarization reversal pattern formed in one of the branching waveguides is a pattern that corresponds to a real part of an impulse response 1/h(t) that compensates for the impulse response h(t) of the optical fiber, a polarization reversal pattern formed in the other branching waveguide is a pattern that corresponds to an imaginary part of the impulse response 1/h(t), and light waves that pass through the two branching waveguides are multiplexed with a predetermined phase difference.

According to a fourth aspect of the invention, in the optical modulator related to the third aspect, the impulse response h(t) of the optical fiber is given by the following formula.

$$h(t) = \frac{1}{2\pi} \int H(\omega)\exp(-j\omega t)dt \quad \text{[Formula 1]}$$

Where, $H(\omega)$ is a transfer function of the optical fiber and $H(\omega)=\exp(j\beta(\omega)L)$. $\beta(\omega)$ is a phase constant of the light waves propagating through the optical fiber, and L is the length of the optical fiber.

According to the first aspect of the invention, since output light that is output from the optical waveguide is guided with an optical fiber, the wavelength dispersion characteristics of the optical fiber transmission line are compensated for by performing polarization reversal of the substrate along the optical waveguide with a predetermined pattern so as to give waveform distortion with characteristics that are inverse to the wavelength dispersion characteristics of the optical fiber transmission line to the light waves propagating through the optical waveguide, and the compensation for the wavelength dispersion characteristics is adjusted to a predetermined level by disposing an adjustment member made of a dielectric material or a metal material in the vicinity of the modulation electrode in an optical modulator that comprises a substrate composed of a material having an electro-optical effect, an optical waveguide formed in the substrate, and a modulation electrode for modulating light waves propagating through the optical waveguide, it is even possible to compensate for characteristic degradation in cases in which wavelength dispersion is generated by the optical fiber transmission line by causing the optical signal to have characteristics that are inverse to the waveform distortion due to the wavelength dispersion of the optical fiber transmission line in advance when an electrical signal is transformed into an optical signal by the optical modulator, Additionally, it is possible to compensate for waveform degradation without depending on the wavelength, and since the optical modulator does not use digital signal processing technology, it is possible to provide an optical modulator that can be applied to high-speed transmission that exceeds a few tens of Gbps.

In addition, since an adjustment member made of a dielectric material or a metal material is disposed in the vicinity of the modulation electrode, it is possible to change the effective refractive index of microwaves propagating through the modulation electrode. As a result of this, it is possible to adjust the compensation for the wavelength dispersion characteristics of the optical fiber transmission line to a predetermined level.

According to the second aspect of the invention, since the distance between the adjustment member and the modulation electrode is set so as to be variably adjustable, it is possible to variably adjust the level of compensation for the wavelength dispersion characteristics of the optical fiber transmission line.

According to the third aspect of the invention, since the optical waveguide includes a Mach-Zehnder waveguide that has two branching waveguides, a polarization reversal pattern formed in one of the branching waveguides is a pattern that corresponds to a real part of an impulse response 1/h(t) that compensates for the impulse response h(t) of the optical fiber, a polarization reversal pattern formed in the other branching waveguide is a pattern that corresponds an imaginary part of the impulse response 1/h(t), and light waves that pass through the two branching waveguides are multiplexed with a predetermined phase difference, it is possible to easily generate light waves that compensate for the wavelength dispersion of the optical fiber transmission line, Additionally, it is possible to easily design and configure settings for a variety of types of wavelength dispersion of optical fibers transmission line by adjusting the polarization reversal pattern and the phase difference.

According to the fourth aspect of the invention, it is possible to easily design and set polarization reversal patterns that compensate for wavelength dispersion that corresponds to various optical fibers and lengths by using the impulse response h(t) of the optical fiber that is shown in the above-mentioned "Formula 1".

DETAILED DESCRIPTION OF THE INVENTION

Figure 1:
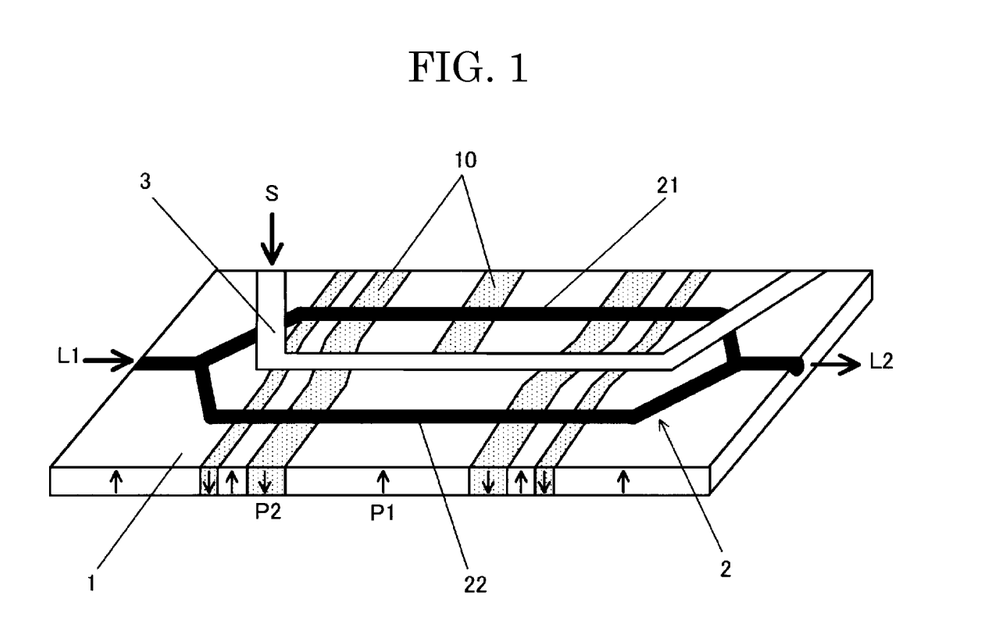
FIG. 1 is a view that shows an example of an optical modulator (a modulator chip) of the present invention.

Hereinafter, the present invention will be described in detail using preferable examples thereof. As shown in FIG. 1, the present invention is an optical modulator that comprises a substrate 1 composed of a material having an electro-optical effect, an optical waveguide 2 formed in the substrate, and a modulation electrode 3 for modulating light waves propagating through the optical waveguide, in which output light L2 that is output from the optical waveguide is guided with an optical fiber (not shown in the drawing), the wavelength dispersion characteristics of the optical fiber transmission line are compensated for by performing polarization reversal 10 of the substrate along the optical waveguide with a predetermined (pattern so as to give waveform distortion with characteristics that are inverse to the wavelength dispersion characteristics of the optical fiber transmission line to the light waves propagating through the optical waveguide, and the compensation for the wavelength dispersion characteristics is adjusted to a predetermined level by disposing an adjustment member made of a dielectric material or a metal material in the vicinity of the modulation electrode.

As the substrate of the present invention composed of a material having an electro-optical effect, for example, it is possible to use lithium niobate, lithium tantalate, PLZT (lead lanthanum zirconate titanate) or a substrate in which a combination of these materials is used. In particular, it is preferable that the material has a large electro-optical effect, and be capable of easily forming an arbitrary polarization reversal structure. More specifically, it is preferable that the material be an electro-optical polymer of lithium niobate and lithium tantalate.

As a method for forming the optical waveguide 2 on the substrate, it is possible to diffuse Ti or the like over the surface of the substrate using a thermal diffusion method, a proton-exchange method or the like. In addition, it is possible to use a ridged waveguide in which parts of the substrate that correspond to the optical waveguide are convex by etching areas of the substrate other than the optical waveguide, or forming grooves on both sides of the optical waveguide or similar.

Modulation electrodes such as a signal electrode 3 and a ground electrode are formed on the substrate 1, these kinds of electrodes can be formed by formation of a Ti/Au electrode pattern, a metal plating method or the like. Furthermore, if necessary, it is possible to provide a buffer layer made from dielectric $SiO_2$ or the like on the surface of the substrate after the formation of the optical waveguide, and form the modulation electrodes on the buffer layer. The S symbol in FIG. 1 is a modulation signal.

An optical fiber is optically connected to the optical modulator of the present invention. It is possible to use a method of directly joining the optical fiber to a substrate having an electro-optical effect using a capillary or the like, or to join the optical fiber to a quartz substrate on which an optical waveguide is formed, by joining the quartz substrate to a substrate having an electro-optical effect. Furthermore, it is also possible to configure such that output light is introduced into the optical fiber through a free-space optical system connected to the substrate having an electro-optical effect, the quartz substrate or the like.

In the optical modulator of the present invention, a substrate made of a material having an electro-optical effect is used, and polarization reversal 10 is performed on a portion of the substrate as shown in FIG. 1. The arrows P1 and P2 indicate the polarization directions of the substrate. If this kind of polarization reversal structure is applied to a traveling-wave electrode optical modulator, it is possible to obtain useful characteristics such as angular velocity matching, complete zero-chirp intensity modulation and optical SSB modulation. The present invention was completed by paying particular attention to that the modulation frequency characteristics of a traveling-wave electrode optical modulator having a polarization reversal structure are applied using Fourier transformation of an impulse response that directly corresponds to a polarization reversal pattern.

That is, by using these characteristics in the manner of the present invention, it is possible to realize an optical modulator in which a pre-equalizing function is combined. Additionally, since the optical modulator of the present invention is different from a common baseband modulator, and it is not necessary to match the group velocity of modulated light and the phase velocity of modulated signals, ultrahigh-speed response that exceeds a few tens of GHz is possible due to the fact that an ultralow loss traveling-wave electrode with a large sectional area is used. In addition, in the manner of the digital signal processing circuits of the prior art, operation that exceeds the boundaries of the electrical equalizing technology that uses a high-speed A/D conversion technique. A high-speed digital signal processing circuit is not necessary in the optical modulator of the present invention, and therefore low power consumption driving is also possible. Furthermore, it is possible to expect a variety of applications including the compensation for phase rotation of the transmission signal due to wavelength dispersion of the optical fiber transmission line.

Hereinafter, the present invention will be described focusing on an optical modulator that performs dispersion compensation for an optical fiber transmission line. The optical modulator of the present invention compensates for characteristic degradation by causing the optical signal to have characteristics that are inverse to the waveform distortion due to the wavelength dispersion of the optical fiber transmission line in advance when an electrical signal is transformed into an optical signal by using an electrooptical modulation technique that uses polarization reversal.

The optical modulator of the present invention can also be used in cases of high-speed transmissions that exceed a few tens of Gbps and even 100 Gbps. Additionally, it is possible to compensate for waveform deterioration without depending on the wavelength. Therefore, the present invention is a ground-breaking piece of technology that is far superior to the dispersion compensation technology of the prior art. The characterizing features of a dispersion compensation technique used by the present invention are as follows.

(1) Capable of responding to high-speed electrons that exceed 40 Gbps for which response with digital signal processing techniques was difficult.
(2) No limit to the bands of wavelength, unlike in the manner of an FBG method.
(3) Can be integrated with a data modulator.

In the dispersion compensation technology to date, there has not been a characterizing feature that combines the above-mentioned (1) and (2), and in particular, the technology of the present invention is exceptional as a dispersion compensation technique in a wavelength multiplexing high-speed transmission system.

Hereinafter, the dispersion compensation technique in the optical modulator of the present invention will be described in detail. If the phase constant of the light waves propagating through the optical fiber is given $\beta(\omega)$, the transfer function $H(\omega)$ of an optical fiber with a length L is expressed using the following formula.

$$H(\omega)=\exp(j\beta(\omega)L)$$

Furthermore, in dispersion compensation, $\beta(\omega)$ can be transformed in the following manner by considering a squared term when $\beta(\omega)$ is Taylor expanded by a carrier angular frequency $\omega=\omega_0$.

$$H(\omega)=\exp(j\beta_2\omega^2L/2)$$

Considering this, $\beta 2$ indicates a Taylor-expanded squared term, and represents group velocity dispersion.

As a result of this, the impulse response h(t) of the optical fiber can be represented by the following Formula 2.

[Formula 2]

$$h(t) = \frac{1}{2\pi}\int H(\omega)\exp(-j\omega t)dt \quad (1)$$
$$= \frac{1}{2\pi}\int \exp(j\beta_2\omega^2L/2)\exp(-j\omega t)dt$$
$$= \frac{1}{\sqrt{2\pi\beta_2 L}}\exp\left[j\left(-\frac{t^2}{2\beta_2 L}+\frac{\pi}{4}\right)\right]$$

In order to compensate for the dispersion of the optical fiber transmission line, in the optical modulator, modulation that corresponds to $h^*(t)(=1/h(t))$, which is the impulse response of the dispersion compensation, can be performed since the transfer function for dispersion compensation for the optical fiber transmission line is $1/H(\omega)=H^*(\omega)$. More specifically, in a case in which an MZ interference optical modulator, which has the Mach-Zehnder waveguide shown in FIG. 1, is used, modulation with a real part $Re\{h^*(t)\}$ of impulse response $h^*(t)$ can be performed by one branching waveguide 21, modulation with an imaginary part $Im\{h^*(t)\}$ can be performed by a second branching waveguide, and the two can be multiplexed with a predetermined phase difference. It is preferable that the phase difference be set so as to be 90°.

Figure 2:
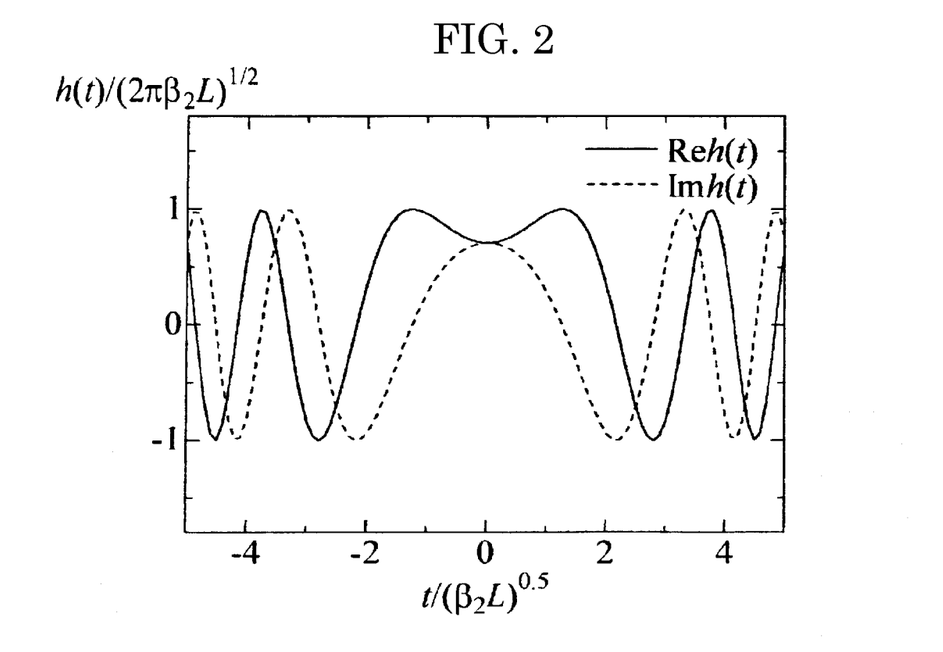
FIG. 2 is a graph that shows an example of a real part (Re {h*(t)}) and an imaginary part (Im {h*(t)}) that compensate for an impulse response h*(t) of an optical fiber.

FIG. 2 is a graph that shows a real part $Re\{h^*(t)\}$ and an imaginary part $Im\{h^*(t)\}$ of an impulse response $h^*(t)$ for dispersion compensation.

Generally, it is difficult to set the impulse responsiveness freely, but if a polarization reversal structure is used in a material that has a one-dimensional electro-optical effect such as a ferroelectric material, it is possible to easily realize such an impulse response.

More specifically, in the manner of FIG. 1, the optical waveguide 2 may include a Mach-Zehnder waveguide that has two branching waveguides (21 and 22), a pattern that corresponds to the real part of the impulse response h*(t)(=1/h(t)) that compensates for the impulse response h(t) of the abovementioned optical fiber may be configured as the pattern of the polarization reversal 10 that is formed in one branching waveguide, and a pattern that corresponds to the imaginary part of the impulse response h*(t) of dispersion compensation may be applied to the pattern of the polarization reversal that is formed in the other branching waveguide.

Light waves that pass through the two branching waveguides are multiplexed with a predetermined phase difference. As a method of generating this phase difference, it is possible to use a method that adjusts the length of each branching waveguide, a method that adjusts the refractive index of the branching waveguides using signal electrode or a DC bias electrode that are disposed along the branching waveguides or similar.

The optical modulator shown in FIG. 1 operates as a dispersion compensation modulator that is provided with a pre-equalizing function. Furthermore, if a double MZ modulator is used, it is possible to perform dispersion compensation with further precision. Additionally, combined use with QPSK modulation and duo-binary modulation is also possible.

Figure 6:
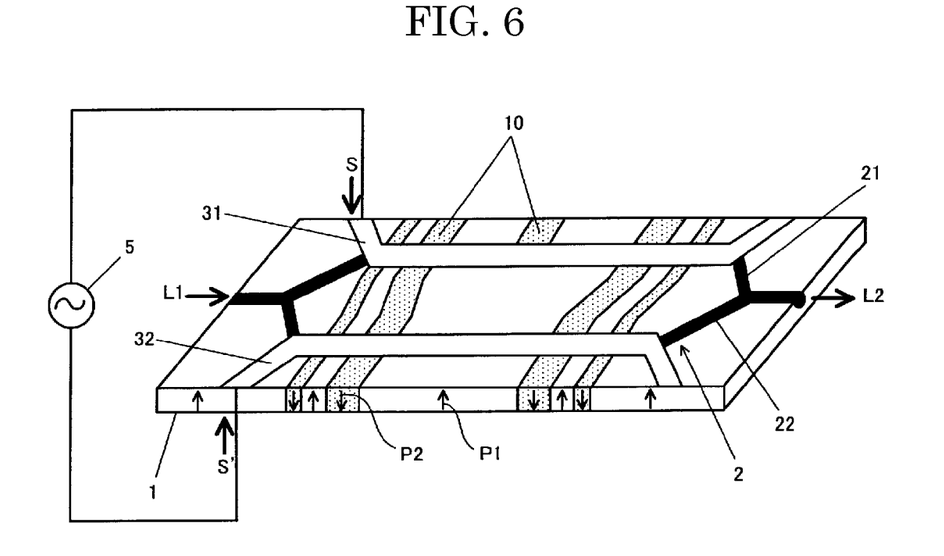
FIG. 6 is a view that shows an example of an optical modulator of the present invention, in which a signal electrode is disposed to correspond to each branching waveguide.
Figure 7:
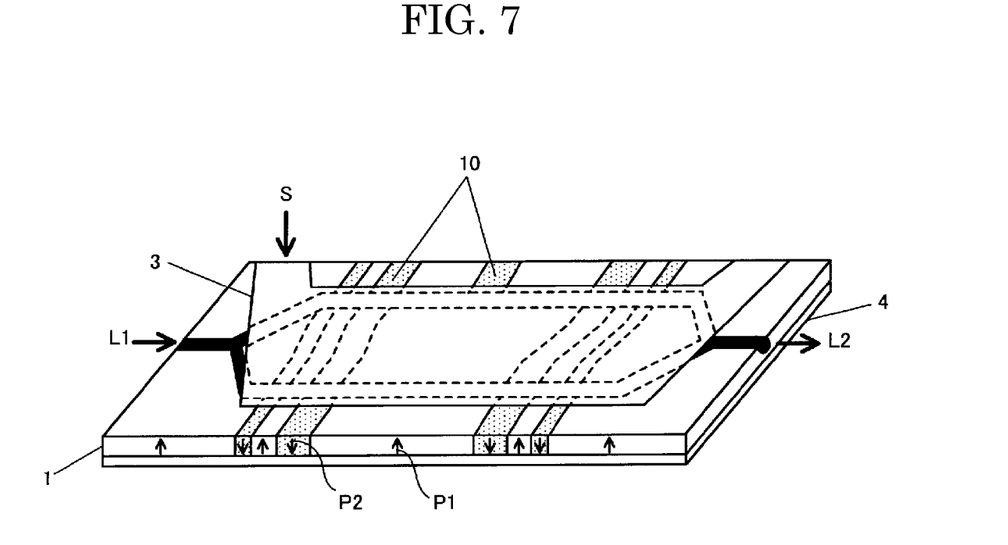
FIG. 7 is a view that shows an example of an optical modulator of the present invention, in which a common signal electrode is disposed on the two branching waveguides.
Figure 8:
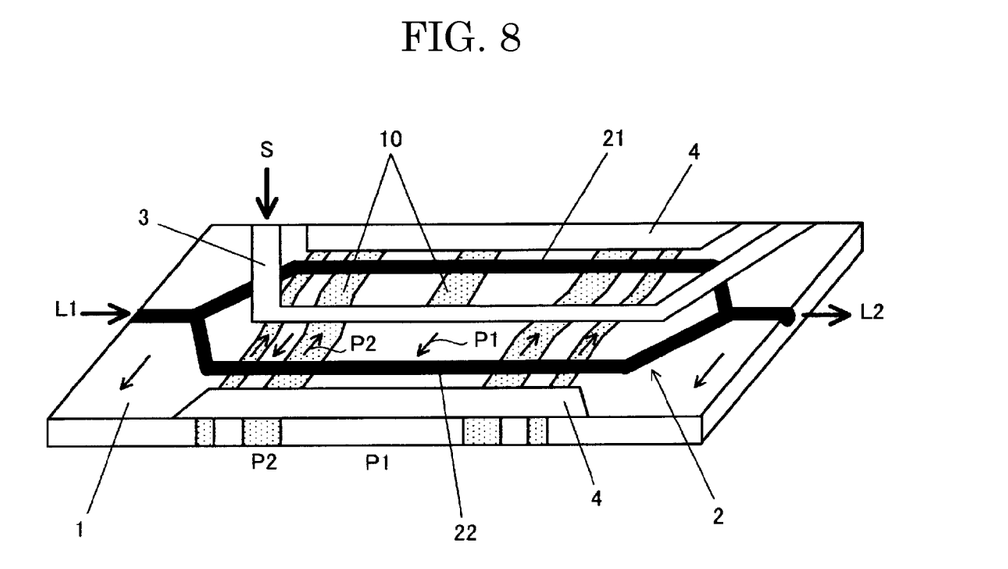
FIG. 8 is an example of an optical modulator of the present invention and is a view that shows an example of an optical modulator of the present invention, in which an X-board is used as the substrate.

In FIG. 1, only a signal electrode 3 is shown as the modulation electrode, and the ground electrode is not shown, but the optical modulator of the present invention is not limited to the configuration shown in FIG. 1, and for example, it is possible to adopt the various dispositions and configurations shown in FIGS. 6 to 8.

In the optical modulator shown in FIG. 6, two signal electrodes 31 and 32 that respectively correspond to two branching waveguides 21 and 22 of the Mach-Zehnder waveguide are formed in the substrate 1. The input terminal of each of the signal electrodes is connected to an AC power source 5, and modulation signals S and S' are input to the input terminals. Additionally, in FIG. 6, the ground electrode is omitted in the same manner as in FIG. 1.

In the optical modulator shown in FIG. 7, a single signal electrode 3 is formed so as to cover the entirety of the two waveguides of the Mach-Zehnder waveguide. Further, a ground electrode 4 is formed on the rear surface of the substrate 1.

Furthermore, in the optical modulator of FIG. 7, if necessary, it is also possible to provide a buffer layer made from dielectric $SiO_2$ or the like between the surface of the substrate 1 and the ground electrode 4 in a case in which a thin board is used in the substrate 1.

In FIGS. 1, 6 and 7, a Z board is used as the substrate 1 of the optical modulator, and accordingly the direction of polarization processing is in a vertical direction to the surface of the substrate, but it is also possible to configure in the manner of the optical modulator shown in FIG. 8 in which an X board (Y board) is used, and the direction of polarization processing is configured in a direction that is parallel to the surface of the substrate. The 3 symbol in FIG. 8 is the signal electrode, and the 4 symbol indicates the ground electrode.

Next, the configuration that adjusts the level of the compensation for the wavelength dispersion characteristics of the optical fiber transmission line, which is the characterizing feature of the optical modulator of the present invention, will be described.

Figure 3:
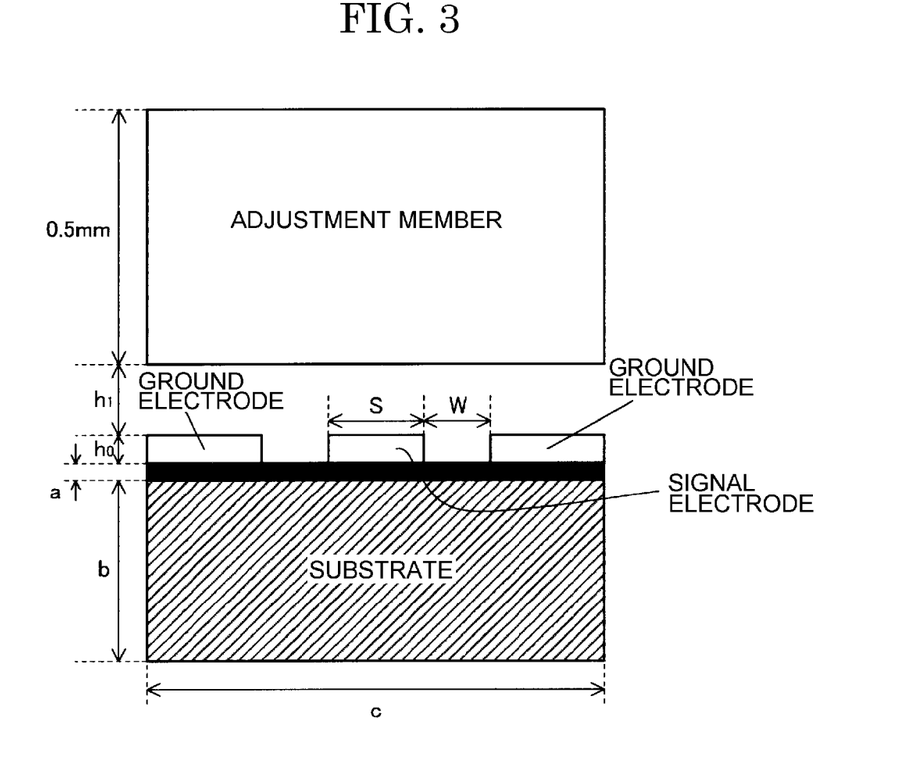
FIG. 3 is a view that shows a state in which an adjustment member is disposed in the optical modulator of the present invention.

FIG. 3 is a view that shows a state in which an adjustment member made of a dielectric material or a metal material is disposed in the vicinity of the modulation electrode that is shown by the optical modulator of FIG. 1. In this manner, it is possible to change the size of the effective refractive index of the microwaves that are propagated through in the modulation electrode, which form the modulation signals by loading an adjustment member into modulator chips that configure the optical modulator. As a result of this, it is possible to greatly adjust the amount of dispersion compensation.

In the cases of FIG. 1 and FIG. 3 in which there is no adjustment member, at the following parameters, the effective refractive index is 4.256 and the length of optical fiber for which compensation is possible is approximately 10 km.

Substrate Material: Lithium Tantalate
Thickness of Substrate (b): 0.4 mm
Width of Substrate (c): 2 mm
Buffer Layer Material: Silicon Oxide
Thickness of Buffer Layer (a): 0.3 μm
Modulation Electrode Material: Aluminum
Height of Modulation Electrode (Signal Electrode and Ground Electrode) ($h_0$): 2 μm
Width of Signal Electrode (S): 33 μm
Space Between Signal Electrode and Ground Electrode (W): 46.5 μm
Refractive Index of Light (Carrier Waves) ($n_g$): 2.409

Figure 4:
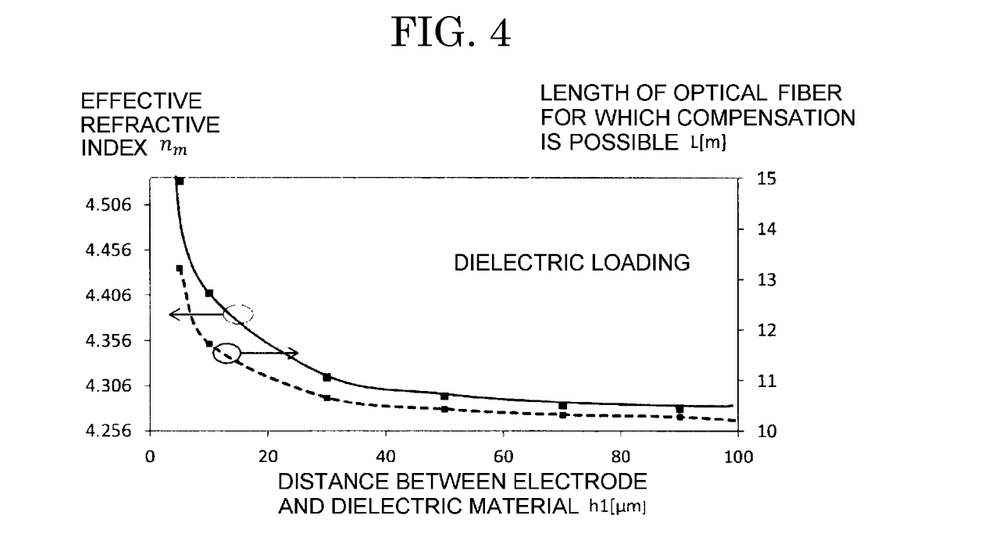
FIG. 4 is a graph that illustrates changes in the effective refractive index and length of optical fiber for which compensation is possible that correspond to the distance between a modulation electrode and the adjustment member in a case in which a dielectric material is used in the adjustment member of FIG. 3.
Figure 5:
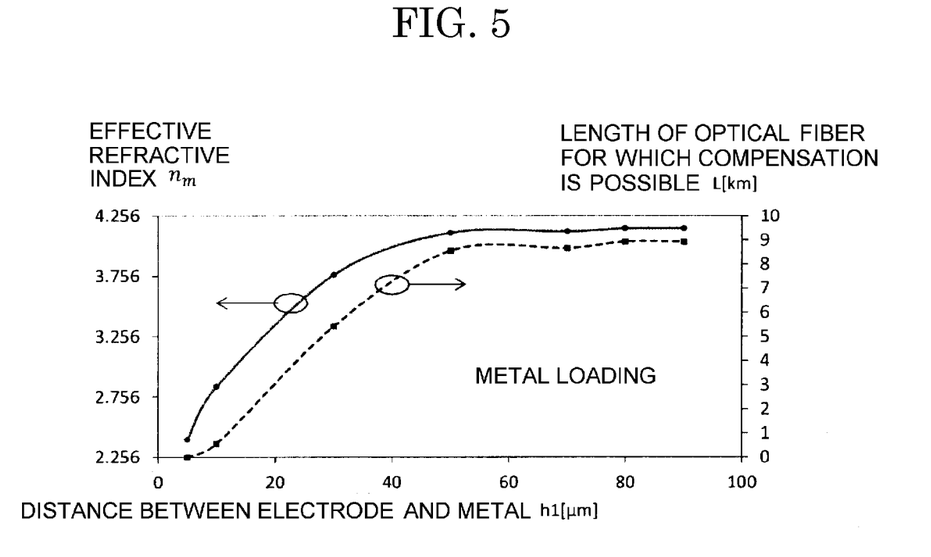
FIG. 5 is a graph that illustrates changes in the effective refractive index and length of optical fiber for which compensation is possible that correspond to the distance between a modulation electrode and the adjustment member in a case in which a metal material is used in the adjustment member of FIG. 3.

In the manner of FIG. 3, the changes in the effective refractive index and length of optical fiber for which compensation is possible were examined for a case in which a high dielectric constant body made from lithium tantalate is loaded as the adjustment member and a case in which aluminum metal is loaded as the adjustment member. The results of the simulations are shown in FIGS. 4 and 5. FIG. 4 shows a case in which a dielectric body is used as the adjustment member, and shows changes in the effective refractive index ($n_m$) and length of optical fiber for which compensation is possible (L) that correspond to the distance ($h_1$) between a modulation electrode and the adjustment member. In addition, FIG. 5 shows the same in a case in which a metal material is used as the adjustment member. The thickness of the adjustment member is configured as 0.5 mm, and the width thereof is configured as 2 mm in the same manner as the substrate.

Since the dielectric constant anisotropy of lithium tantalate and lithium niobate is large, it is necessary to take the anisotropy into account in order to perform a simulation with accurate characteristics, but in this case, in order to simplify the simulation, the relative permittivity $\in_r$ of a lithium tantalite high dielectric constant body is calculated as 42. A higher permittivity results in a greater amount of change in the refractive index, or in other words, a greater increase in the amount of adjustment of the dispersion compensation. In order to secure high frequency characteristics in the device, a material in which the dielectric loss (tan δ) in high-frequency waves is small, is desirable. On the other hand, in a case in which metal is loaded, regardless of whether the metal material is aluminum, gold, silver or copper, provided the material is a good conductor, the change in the refractive index, or in other words, the range for which compensation is possible shows substantially the same characteristics. In this case, values for aluminum are for convenience when executing the simulation, but since a loaded metal is also used as a portion of the electrode, it is desirable to use a metal with high conductivity in high-frequency waves such as gold, silver or copper in order to secure high frequency characteristics in the device.

In addition, the simulation is performed with the thickness of the loaded material set as 0.5 mm, but the resulting thickness differs in a case in which the loaded material is a dielectric material and a case of a metal. In a case of a dielectric material, since the electric field of the signal enters the inside of the dielectric material, the greater the thickness, the greater the effect on the amount of change in the refractive index, or in other words, the increase in the amount of adjustment of the dispersion compensation. The thickness is set depending on the specific permittivity of the loaded dielectric material and the target amount of dispersion compensation. On the other hand, in a case of a metal, since the electric field inside the metal is approximately zero, there is no effect on the amount of change in the refractive index, or in other words, the increase in the amount of adjustment of the dispersion compensation even if the thickness is increased. It is possible to reduce the thickness within a range which allows signal decay and degradation that results from surface loss in the frequency band of the signal that is used.

Referring to FIG. 4, in a case in which a dielectric body is loaded, when the distance from the loaded dielectric body is reduced, the refractive index of the electric signal increases greatly, and it is possible to adjust the amount of dispersion compensation in a range of approximately 0% to +40%. In addition, referring to FIG. 5, in a case in which a metal is loaded, when the distance from the loaded metal is reduced, the refractive index of the electric signal decreases greatly, and it is clear that it is easy to adjust the amount of dispersion compensation in a range of approximately −50% to 0%. As a result of the abovementioned features, by using an adjustment member in the optical modulator of the present invention, it is possible to greatly change the level by which the wavelength dispersion characteristics of the optical fiber transmission line are compensated for. The impedance also changes in addition to the change in the refractive index in both a case in which a dielectric body is loaded and a case in which a metal is loaded, but design correspondence and management of changes in impedance are possible by designing the electrode configuration, selecting driving circuit, using the impedance matching circuit and the like.

In addition to disposing the adjustment member at a predetermined position in a fixed manner so as to achieve an amount of dispersion compensation that is set in advance, it is also possible to configure the adjustment member so that the position thereof is adjustable, and therefore is configured such that it is possible to change the amount of dispersion compensation.

In the example shown in FIG. 3, a high dielectric constant material being sufficiently wide with respect to the width (=S+2W) of the coplanar electrode on the substrate of the modulator, is loaded. In this case, a gap h between the modulator and the loaded high dielectric constant material becomes an effective positioning adjustment parameter. In a case in which the width of the high dielectric constant material is smaller than approximately three times the width (=S+2W) of the coplanar electrode, an adjustment value of a large dispersion compensation amount can be obtained by adjusting the position of the high dielectric constant material in the left and right direction of FIG. 3. In this case, a greater adjustment value can be obtained from a smaller width of high dielectric constant material and a larger amount of dielectricity. In this configuration, it is favorable to choose a material that is made of PLZT, PZT, KTN or the like that have high specific permittivities of 100 or more. In addition, in a case of using a material such as KTN in which the temperature dependence of the permittivity is extremely high, an adjustment value of a large dispersion compensation amount can be obtained by adjusting the temperature. In a case in which a metal is loaded, the effects of the width and the adjustment value of the position of the loaded metal are the same as those of the case of the high dielectric constant material. However, in the case of a metal, the dispersion compensation amount adjustment value that results from temperature is extremely small. Additionally, in both a case in which the loaded material is a high dielectric constant material and a case in which the loaded material is a metal, the adjustments of the position thereof may be performed in either the vertical direction or the horizontal direction, or may be performed in both directions, and may be used in combination with adjustments due to temperature in a case of using a high dielectric constant material in which the temperature dependence of the permittivity is large.

The invention has been described above using a case of a coplanar electrode, but the effect is the same in a configuration with a microstrip electrode or a slot type electrode in which the signal electrode is positioned on the surface of the substrate in the same manner as in the coplanar electrode. In a case of a configuration in which the electrode is embedded in the dielectric material, the effect is weakened, but there is a practical effect in a case in which the depth of the embedding is sufficiently shallow with respect to the gap between the electrode (less than or equal to approximately half of the gap between the electrode).

In the manner described above, according to the optical modulator of the present invention, it is possible to compensate for wavelength dispersion of an optical fiber transmission line, and it is possible to provide an optical modulator that can be applied to high-speed transmission that exceeds a few tens of Gbps.

DESCRIPTION OF REFERENCE NUMERALS AND SIGNS

1 Substrate composed of a material having an electro-optical effect
2 optical waveguide
21, 22 branching waveguides
3, 31, 32 signal electrodes
4 ground electrode
10 polarization reversal pattern
L1 input light
L2 output light
S modulation signal

The invention claimed is:
1. An optical modulator comprising:
a substrate composed of a material having an electro-optic effect;
an optical waveguide formed in the substrate; and
a modulation electrode for modulating lightwaves propagating through the optical waveguide,
wherein output light that is output from the optical waveguide is guided with an optical fiber transmission line, in which the modulated lightwaves are transmitted, wavelength dispersion characteristics of the optical fiber transmission line are compensated for by performing polarization reversal of the substrate along the optical waveguide with a predetermined pattern so as to give waveform distortion with characteristics that are inverse to the wavelength dispersion characteristics of the optical fiber transmission line to the lightwaves propagating through the optical waveguide, and
the compensation for the wavelength dispersion characteristics of the optical fiber transmission e is adjusted to a predetermined level by disposing an adjustment member made of a dielectric material or a metal material in the vicinity of the modulation electrode.
2. The optical modulator according to claim 1,
wherein the distance between the adjustment member and the modulation electrode is set so as to be variably adjustable.

3. The optical modulator according to claim 2, wherein
the optical waveguide includes a Mach-Zehnder waveguide that has two branching waveguides,
a polarization reversal pattern formed for one of the branching waveguides is a pattern that corresponds to a real part of an impulse response 1/h(t) that compensates for the impulse response h(t) of the optical fiber,
a polarization reversal pattern formed for the other branching waveguide is a pattern that corresponds to an imaginary part of the impulse response 1/h(t), and
lightwaves that pass through the two branching waveguides are multiplexed with a predetermined phase difference.

4. The optical modulator according to claim 3,
wherein the impulse response h(t) of the optical fiber is given by the following formula, $$h(t) = \frac{1}{2\pi} \int H(\omega)\exp(-j\omega t)dt \quad \text{[Formula 3]}$$

wherein,
H($\omega$) is a transfer function of the optical fiber,
H($\omega$) =exp(j$\beta$($\omega$)L),
$\beta$($\omega$) is a phase constant of the lightwaves propagating through the optical fiber, and
L is the length of the optical fiber.

5. The optical modulator according to claim 1 or claim 2, wherein
the optical waveguide includes a Mach-Zehnder waveguide that has two branching waveguides,
a polarization rsal pattern formed for one of the branching waveguides is a pattern that corresponds to a real part of an impulse response 1/h(t) that compensates for the impulse response h(t) of the optical fiber,
a polarization reversal pattern d for the other branching waveguide is a pattern that corresponds to an imaginary part of the impulse response 1/h(t), and
lightwaves that pass through the two branching waveguides are multiplexed with a predetermined phase difference.

6. The optical modulator according to claim 5,
wherein the impulse response h(t) of the optical fiber is given by the following formula, $$h(t) = \frac{1}{2\pi} \int H(\omega)\exp(-j\omega t)dt \quad \text{[Formula 3]}$$

wherein,
H($\omega$) is a transfer function of the optical fiber,
H($\omega$) =exp(j$\beta$($\omega$)L),
$\beta$($\omega$) is a phase constant of the lightwaves propagating through the optical fiber, and
L is the length of the optical fiber.

7. An optical modulator comprising:
a substrate composed of a material having an electro-optical effect;
an optical waveguide formed in the substrate; and
a modulation electrode for modulating lightwaves propagating through the optical waveguide,
wherein output light that is output from the optical waveguide is guided with an optical fiber transmission line, in which the modulated lightwaves are transmitted, wavelength dispersion characteristics of the optical fiber transmission line are compensated for by performing polarization reversal of the substrate along the optical waveguide with a predetermined pattern so as to give waveform distortion with characteristics that are inverse to the wavelength dispersion characteristics of the optical fiber transmission line to the lightwaves propagating through the optical waveguide, and
the compensation for the wavelength dispersion characteristics of the optical fiber transmission line is adjusted to a predetermined level by disposing an adjustment member made of a dielectric material in the vicinity of the modulation electrode and adjusting the temperature thereof.

8. The optical modulator according to claim 7,
wherein the optical modulator is equipped with at least a mechanism that adjusts temperature of the dielectric material part of the adjustment member.

* * * * *